Oct. 26, 1965     P. H. GRIFFIN III     3,214,019
OVERLOAD CONTROLLED DRILLING MUD TREATMENT SYSTEM
Filed Oct. 21, 1960     2 Sheets-Sheet 1
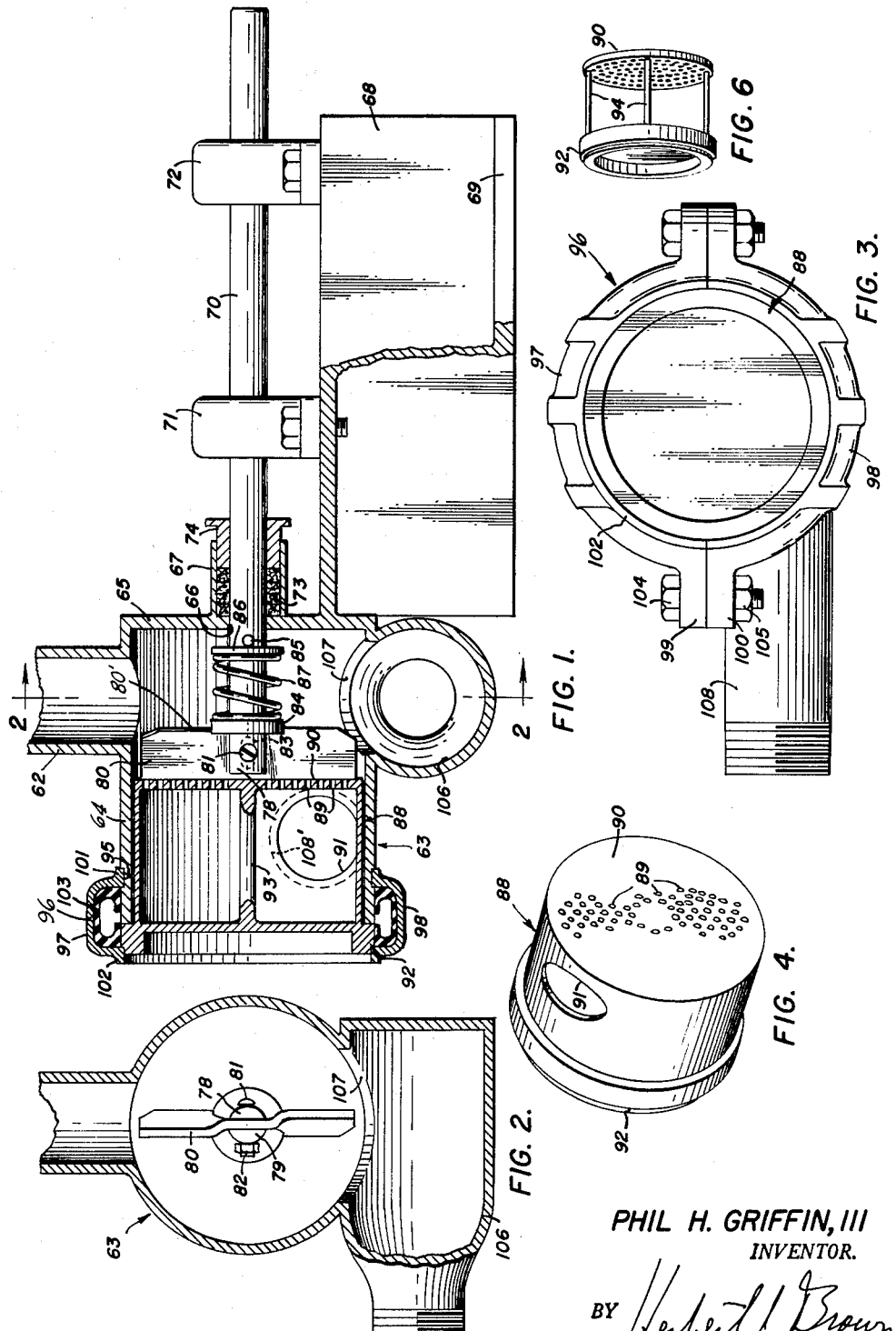
PHIL H. GRIFFIN, III
INVENTOR.
BY Herbert J. Brown
ATTORNEY

PHIL H. GRIFFIN, III
INVENTOR.

BY Herbert J. Brown
ATTORNEY

United States Patent Office 3,214,019
Patented Oct. 26, 1965

3,214,019
OVERLOAD CONTROLLED DRILLING MUD
TREATMENT SYSTEM
Phil H. Griffin III, Fort Worth, Tex., assignor to Bass
Brothers Enterprises, Inc., Fort Worth, Tex.
Filed Oct. 21, 1960, Ser. No. 64,190
7 Claims. (Cl. 210—97)

This invention relates to mud dilution apparatus and has reference to construction of a mechanical screen for coaction therewith.

In the delivery of drilling mud to a classifier for extraction and recovery of barium sulphate or other valuable constituents it is generally advantageous for the mud to be pumped at a constant volumetric rate and to have its specific gravity reduced by water dilution. Ideally, the mud drawn into the intake port of a mud pump would contain only finely divided solids including clays and weighting materials in aqueous suspension for delivery to and separation in the classifier, but, under ordinary operating circumstances, granular and other extraneous materials not susceptible to treatment by the classifier are also drawn into the mud pump. These materials tend to clog the orifices of a simple passive screen interposed in the intake conduit of the pump so that the volume of fluids discharged is restricted or the pump and conduit become overloaded. Use of an independently powered brush or scraper to keep the screen clear leads not only to extra cost but presents the additional hazard of its jamming and burning out the auxiliary motor with consequent recurrence of the aforementioned problems.

Accordingly, an object of the present invention is to provide, in combination, a mud dilution apparatus and a mechanical screen which are interdependent in their operations so that jamming of the screen entails disengagement of the mud pump from its source of power.

A further object of the invention is to provide a mud dilution apparatus having a mechanical screen and whereby flush water continues to flow to a classifier upon failure or disconnection of the screen and mud pump from their power source.

Another object of the invention is to provide an integrated and coactive mud dilution and mechanical screening combination wherein only a portion of fluids discharged thereby are passed through the screen.

A particular object of the invention is to provide a common fail safe drive system for a mechanical screen and a mud dilution apparatus.

These and other objects will become apparent from the following description and the accompanying drawings, wherein:

FIGURE 1 is a partially sectional side elevational view of a mechanical screen as defined herein.

FIGURE 2 is a sectional view taken along line 2—2 in FIGURE 1 with respect to the housing illustrated therein.

FIGURE 3 is a rear elevational view of the mechanical screen shown in FIGURE 1.

FIGURE 4 is a perspective view of a perforated screen body shown in a preferred form of construction.

FIGURE 6 is a reduced perspective view of a screen body shown in an alternate form of construction.

Figure 5:
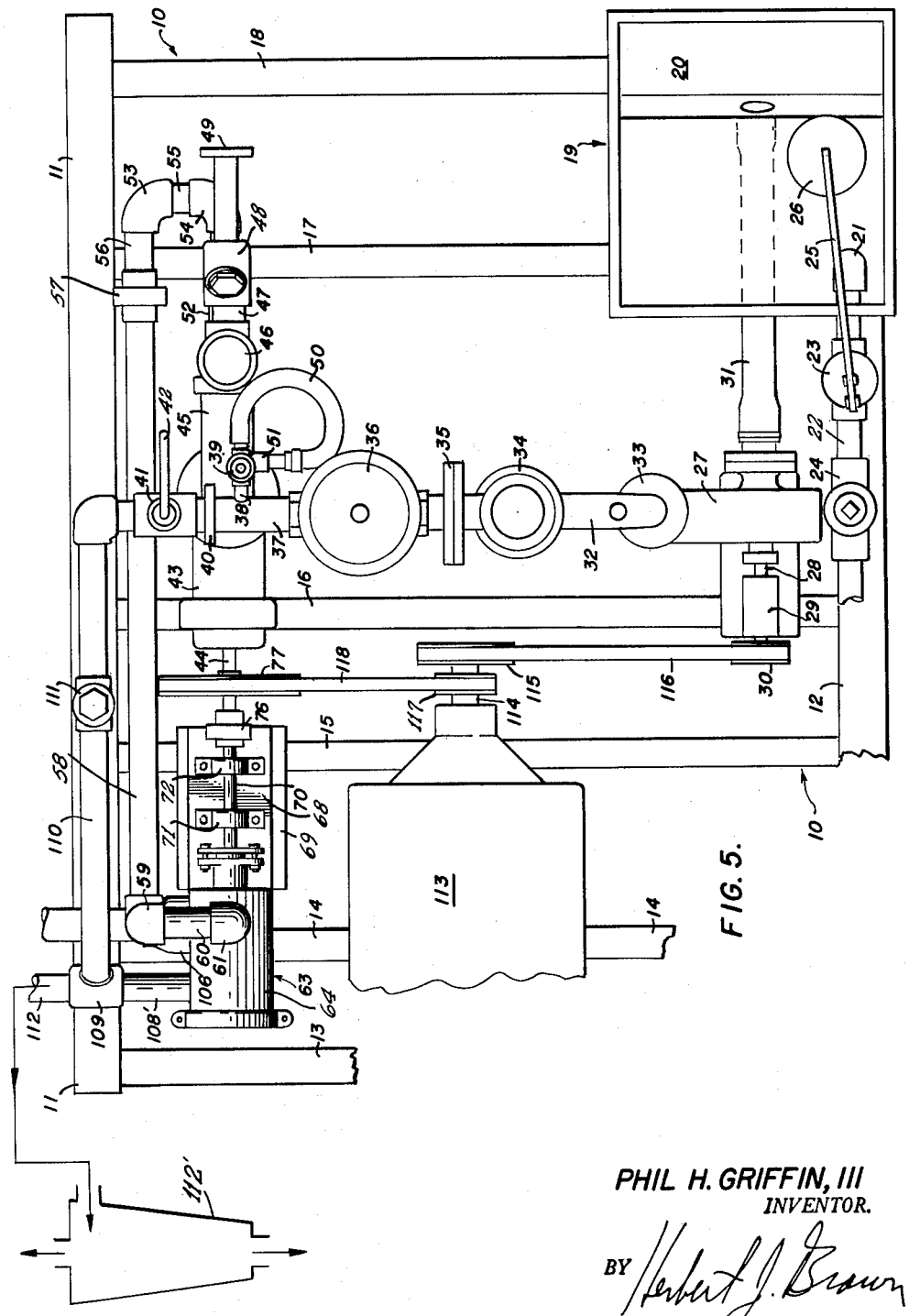
FIGURE 5 is a broken plan view of the invention illustrating the interrelationship of component parts thereof.

As a mud dilution apparatus, the present invention has utility in preparation of slurries for subsequent treatment by mechanisms and processes not described in this specification or shown in these drawings. For the recovery of barium sulphate from drilling muds, which may be characterized as a typical use, the invention may be advantageously utilized as a feed device for a hydrocyclone classifier; it should be noted, however, that a variety of industrial processes requiring delivery of screened and diluted slurries at constant volume rates may be benefited by use of the present invention.

Generally, the invention comprises a wiper or scraper arm rotatably positioned against a disk screen in a suitable housing and engagement of the scraper arm interiorly of the housing by an extended portion of the drive shaft of a positive displacement pump. The scraper arm is biased against the disk screen by spring means, but the connection between the wiper or scraper arm and the shaft, though axially movable with respect to the shaft, is angularly fixed and is not provided with a sheer disconnection for operation under stress. The scraped arm is not only driven by the shaft but is in positive angular engagement therewith so that stoppage of the scraper arm entails discontinuation of pumping. A belt drive is provided from a prime mover to the common shaft of the positive displacement pump and the scraper arm, it being understood that this element is the weakest of the described components and will break before damage is done to the prime mover, positive displacement pump, shaft, or scraper arm.

With specific reference to the drawings, a base frame generally designated by the numeral 10 is supported by a floor or the ground and is constructed as a lattice like structure including parallel side members 11 and 12 and a plurality of lateral members 13 through 18 spaced from one another and extending perpendicularly between the side members; each of the side members and lateral members is horizontally disposed, and the lateral members are attached to the side members to form the rigid frame 10. A box-like water tank 19 is positioned upon and supported by one corner of the frame 10 and a sump 20 is integrally constructed as a portion of the bottom of the tank. A downwardly directed spigot 21 projects interiorly of the tank 19 from a wall thereof and communicates with a water service line 22 through a float valve 23 and a manual shut-off valve 24. Whereas the float valve 23 is positioned exteriorly of the tank 19, the actuating rod 25 of the float valve extends over a side wall of the tank into the interior thereof and, on its projecting end, carries a bulb 26 responsive to the level of water within the tank. A centrifugal water pump 27 is supported by the frame 10 rearwardly of the tank 19 and is provided with a rearwardly projecting shaft 28 journaled to and projecting rearwardly of a bearing 29 and a sheave 30 is mounted on the shaft 28 rearwardly of the bearing 29. A flexible water hose 31 communicates the sump 20 of the water tank 19 with the intake of the centrifugal pump 27, and a conduit 32 communicates the exhaust port 33 of the centrifugal pump 27 with the intake side of a continuous flow indicator 34 which may be constructed as any of a number of commercially available types. A flanged coupling 35 is connected between the outlet of the continuous flow indicator 34 and the high pressure side of a fluid pressure regulator 36 of conventional construction. The low pressure side of the pressure regulator 36 is connected to and communicates with a manifold 37 which has two outlet openings, the smaller of which communicates with a nipple 38 and through the nipple with a small manual valve 39; the larger exhaust opening of the manifold 37 is connected by a union 40 to one side of a large manual valve 41 shown with a lever type handle 42. Beneath the manifold 37 a positive displacement mud pump 43 is positioned upon and supported by the frame 10 and has its drive shaft 44 projecting rearwardly and parallel with the shaft 28 of the centrifugal pump 27. A mud feed line 45 communicates the intake port (not shown) of the positive displacement pump 43 with a manual intake valve 46 which is connected at its opposite side by a stub joint 47 to a check valve 48 oriented to permit flow of fluids mud toward but not away from the feed line 45; the opposite side of the check valve is provided with a fitting 49 adapted to communicate with a mud line (not shown). A flexible hose 50 communicates the small manual valve 39 with a check valve 51 in such communication with the feed line 45 of the positive displacement mud pump 43 as will permit a flow of water from the manifold 37 through the flexible hose 50 into the mud feed line but not in a direction from the mud feed line into the flexible hose. The exhaust port of the positive displacement mud pump 43 communicates with an exhaust line 52 positioned beneath the feed line 45. Through connecting elbows 53 and 54, stub joints 55 and 56 and a union 57, the exhaust line 52 of the positive displacement pump 43 is connected to and communicated with a pipe 58 which is laterally spaced from the pump and extends rearwardly thereof. It should be noted that the direction of flow within the pipe 58 is the opposite of the direction of flow within the exhaust line 52 of the positive displacement pump 43 and that the pipe 58, being spaced from the pump, carries fluids discharged under pressure from the mud pump 43 to a position laterally spaced from and rearwardly of the mud pump. A double elbow 59 is connected to the rearward end of the pipe 58 and is also connected to a lateral line 60 which is horizontally disposed at a level above that of the pipe 58; the other end of the lateral line 60 is connected to and communicates with an elbow 61 connected to the upper end of a vertical intake line 62 (FIGURE 1) of a mechanical screen generally designated by the numeral 63. The arrangement and orientation of the mechanical screen with respect to the positive displacement mud pump 43 and other components is an important feature of the present invention. A hollow cylindrical housing 64 is positioned rearwardly of the positive displacement pump 43 and is in axial alignment with the shaft 44 of the positive displacement pump. The forward end of the cylindrical housing 64 is closed by an integral end plate 65 provided with a central opening 66 therein. A stuffing box 67 projects forwardly of an exteriorly from the end plate 65 with the axis of the stuffing box passing through the center of the opening 66 in the end plate 65. A box-type bed plate 68 having lateral flanges 69 at the bases of the sides thereof, is attached at its rearward end to the end plate 65 of the cylindrical housing 64 beneath the stuffing box 67 thereon and extends forwardly of the end plate with the top of the bed plate defining a horizontal plane parallel with the axis of the stuffing box. The flanges 69 of the bed plate 68 are supported by and attached to the frame 10. A scraper shaft 70 is rotatably supported by pillow blocks 71 and 72 attached to the top of the bed plate 68 and the rearward end of the shaft extends through the stuffing box 67 and opening 66 of the end plate 65 and projects interiorly of the cylindrical housing 64. Packing 73 is positioned within the stuffing box 67 about the shaft 70 and is compressed within the stuffing box 67 by a packing gland 74 held within the stuffing box 67 by a pressure plate bolted to flanges on the stuffing box. The forward end of the scraper shaft 70 is connected to one end of a flexible coupling 76 which, in turn, engages the rearward end of the shaft 44 of the positive displacement mud pump 43. Between the flexible coupling 76 and the pump 43 a sheave 77 is mounted on and engages the pump drive shaft 44. Interiorly of the cylindrical housing 64, the rearward end of the scraper shaft 70 is bifurcated by a longitudinal slot formed through the axis of the shaft so that the shaft terminates in opposed segmental portions 78 and 79 (FIG. 2). A scraper blade 80 constructed generally as a flat bar but which may have its opposite ends pitched with respect to its central portion, is centrally received between the terminating segmental portions 78 and 79 of the rearward end of the shaft 70 of the mechanical screen 63 and a screw 81 passing through the segmental portions of the shaft and through the scraper blade 80 is engaged and held by a nut 82. As best illustrated in FIGURE 1 and there shown by dotted lines, a slot 83 longitudinal with respect to the axis of the scraper shaft 70, is formed in the wiper blade 80 and receives the screw 81. The forward edge of the blade 80 is recessed at 80' adjacent the shaft 70 and a washer 84 loosely journaled about the shaft 70 is received within the recessed portion of the blade. Between the blade 80 and the end plate 65 of the cylindrical housing 64 a pin 85 is positioned perpendicularly through the shaft 70 of the mechanical screen 63 with respect to its axis and opposite ends of the pin project radially and exteriorly of the shaft. Between the blade 80 and the pin 85 a second washer 86 is likewise loosely journaled to the shaft 70, and a helical compression spring 87 is positioned about the shaft between the washers 84 and 86. A hollow cylindrical, drum-like filter or screen body 88 is interiorly and coaxially received by the cylindrical housing 64 with the forward end of the drum-like body 88 bearing against the rearward edge of the scraper blade 80. In a preferred embodiment of the invention, all sides of the hollow drum-like body 88 are enclosed but a plurality of perforations 89 are formed in the forward end 90 thereof and a single circular opening 91 is formed in a side thereof opposite a corresponding opening in the side of the cylindrical housing 64. The perforations 89 in the forward wall of the drum-like body 88 constitute a screen restricting passage of granular particles into the interior of the drum-like body 88. An annular shoulder 92 is formed about the drum-like body 88 near the rearward end thereof and is adapted to seat against the rearward end of the cylindrical housing 64. One or more reinforcing members 93 extends between the forward and rear walls of the drum-like body 88. In an alternate form of construction of the drum-like body 88, as illustrated in FIGURE 6, so much of the cylindrical walls thereof as are positioned forwardly of the annular shoulder 92 may be replaced by a plurality of horizontal posts 94 spaced equidistantly from the axis of the cylindrical housing 64 and extending between the forward and rear walls of the drum-like body 88. An annular groove 95 is formed in the exterior surface of the cylindrical housing 64 with the groove being disposed normal to the axis of the housing. A hollow semi-toroidal bracket 96, constructed of two substantially semicircular members 97 and 98 respectively provided with opposing lateral flanges 99 and 100, has an inwardly directed forward edge 101 adapted to be received by the groove 95; the corresponding rearward edge 102 of the semi-toroidal bracket 96 engages the rearward end of the drum-like body 88 and bears upon the rearward surface of the shoulder 92 thereon. A resilient gasket 103, formed generally in the shape of a tire casing, is positioned within the semi-toroidal bracket 96, and the opposing lateral flanges 99 and 100 of the two halves 97 and 98 of the bracket are attached to one another by nuts and bolts 104 and 105. The gasket 103 so confined by the semi-toroidal bracket 96 forms a seal between the drum-like body 88 and the cylindrical housing 64; pressured fluid within the housing 64 which might otherwise escape through the junction between the rearward end of the housing and the forward surface of the shoulder 92 on the drum-like body 88 tends to expand the gasket within the semi-toroidal bracket and enhance the resistance of the seal, so formed, to leakage. A trap 106 is integrally constructed with the cylindrical housing 64 on the lower side thereof and an opening 107 communicates the trap with so much of the interior of the cylindrical housing 64 as lies between the screen 90 and the forward end plate 65. A waste line 108 (FIG. 3) including a manually operated valve (not shown) communicates the trap 106 with any suitable waste disposal area or receptacle (not shown). An exhaust line 108' carries screened fluids from the cylindrical housing 64 and communicates the opening 91 in the side of the drum-like body 88 with one inlet port of a mixing T 109. A second inlet port of the mixing T 109 is connected to a water by pass line 110 which communicates the mixing T with the larger outlet port of the manifold 37 through the previously described manual valve 41 thereon. A check valve 111 permitting flow only in the direction of the mixing T 109 is interposed in the water bypass line 110. A delivery pipe 112 communicates the outlet port of the mixing T with the intake of any subsequent processing apparatus such as hydrocyclone classifier 112'.

An engine or motor 113 is supported by the frame 10 with its shaft 114 parallel with and between the shaft 28 of the centrifugal pump 27 and the shaft 44 of the positive displacement pump 43. A sheave 115 on the shaft 114 of the engine 113 engages a belt 116 which is also engaged by the sheave 30 on the centrifugal pump shaft 28; a second sheave 117 on the engine shaft 114 engages another belt 118 which drives the sheave 77 on the shaft 44 of the positive displacement pump 43.

Means utilizing interconnected centrifugal and positive displacement pumps to control the consistency and volume of diluted mud dispersions, as incorporated in the foregoing description, have previously been disclosed in the application of Richard L. O'Shields, Ser. No. 814,336, filed May 19, 1959, now Patent No. 3,085,587, issued April 16, 1963. The water tank 19 and float valve 23 provide a constant source of water for the centrifugal pump 27 which, deriving power from the engine 113, provides a constant head of water at its exhaust port 33. The pressure regulator 36 reduces pressure of water discharged into the manifold 37 and permits variations in the volume of water discharged by the centrifugal pump 27 while maintaining a constant head of pressure. The positive displacement mud pump 43 discharges fluids at a constant volumetric rate into the counterflow pipe 58; in order to vary the ratio between fluids drawn through the mud intake line fitting 49 and discharged through the counterflow pipe 58, water is drawn from the manifold 37 and delivered through the flexible hose 50 and check valve 51 to the intake of the positive displacement mud pump 43. The manual control valve 39 is used to regulate the rate at which mud is supplanted by water at the intake of the positive displacement pump 43. After having its rate of flow regulated by the manual valve 41 water discharged through the larger exhaust port of the manifold 37 is subsequently intermixed with fluids discharged by the positive displacement mud pump 43. Check valves 48 and 111 respectively prevent back flow of water through the mud intake line fitting 49 and back flow of intermixed fluids through the water line 110 which bypasses the positive displacement pump 43.

The present invention is directed primarily to the construction and arrangement of components for screening and ejecting granular particles or other extraneous matter from the discharge of the positive displacement mud pump 43. Elbows 53 and 54 connected in series with the mud discharge line 52 of the positive displacement pump 43 direct discharged fluids (mud) laterally away from and thence rearwardly of the discharge line 52 and counterflow pipe 58 connected as a continuation of the elbows 53 and 54 and discharge line 52 carries the discharged fluids rearwardly with respect to the frame 10 where the double elbow 59, lateral line 60 and elbow 61 transport the same fluids in a downward direction of flow through inlet line 62 into the housing 64 where they are directed toward the axis, rearwardly extended, of the shaft 44 of the positive displacement mud pump. Joined to the shaft 44 of the positive displacement pump 43 by the flexible coupling 76 is the scraper shaft 70 located within the screen housing 64 which receives the discharge of the positive displacement pump through inlet pipe 62. The drum-like filter or screen body 88 positioned within the cylindrical housing 64 of the mechanical screen 63 has its forward face provided with perforations 89 which constitutes a screen through which fluids introduced into the cylindrical housing through its vertical intake line 62 must pass and from which granular particles are separated. When the scraper shaft 70 of the mechanical screen 63 is rotated the scraper blade 80 disengages the granular particles from the various perforations 89 in the screen 90 and by centrifugal force these granular particles are carried radially of the axis of the scraper shaft 70 and accumulate in the trap 106. The elongate slot 83 in the blade 80 permits longitudinal displacement of the scraper blade 80 with respect to the shaft 70 and compensates for wear at the bearing edge of the blade in addition to permitting the blade to ride over and crush small granular particles by a series of impacts therewith. The helical tension spring 87 urges the blade 80 against the screen 90 but the washer 84 within the recess 80' in the forward edge of the blade 80 tends to keep the blade 80 perpendicular to the axis of the shaft 70. Granular particles may be ejected from the trap 106 from time to time by opening a valve (not shown) provided on the waste line 108 for that purpose. Fluids (mud) which pass thence through the screen 90 pass through the opening 91 in the drum-like body 88 and through the exhaust line 108 to the mixing T 109 where they are mixed with and diluted by water flowing through the water bypass line 110.

Coupling the shaft 44 of the positive displacement mud pump with the shaft 70 of the mechanical screen 63 provides more than a simple and convenient way to drive these two components from a common sheave 77. It will be remembered that there are two pumps, one centrifugal and the other of the positive displacement type, provided in the described mud dilution system. Should a length of cable, a metal object, a strip of cloth, or large cuttings from a well bind upon or block rotation of the blade 80, it is important for the protection of various parts of the described apparatus that pumping of the positive displacement pump 43 be discontinued, but for protection of equipment (such as a classifier, and the lines 112 etc. leading thereto) fed by the described apparatus continued flow of water from the system is advantageous. If the position of the scraper blade 80 becomes blocked or fixed within the cylindrical housing 64 the connection of the scraper shaft 70 to the shaft 44 of the positive displacement mud pump 43 by means of the flexible coupling 76 stops these two units together; continued rotation of the shaft 114 of the engine 113 will break the belt 118 driving the sheave 77 of the components so frozen. The belt 116, however, continues to interconnect the sheave 115 of the engine 113 and the sheave 30 of the centrifugal water pump 27 so that water continues to flow through the water bypass line 110 and the delivery line 112 leading to the classifier and subsequent processing apparatus; settling and coagulation within the delivery line 112 are thus prevented and the line is kept clear. By mere disconnection of the bolts and nuts 104 and 105 attaching the two halves 97 and 98 of the semi-toroidal bracket 96 together, removal of the gasket 103 and withdrawl of the drum-like screen body 88 from the cylindrical housing 64, obstructions may be removed from within the cylindrical housing and the scraper blade 80 may be freed for rotation. A broken drive belt constitutes the only permanent damage to the fouled system, and performs generally the function of a frangible device such as a shear pin or the like.

The invention is not limited to the exemplary construction herein shown and described, but may be made in various ways within the scope of the appended claims.

What is claimed is:

1. In a mud dilution apparatus including a prime mover and a positive displacement mud pump having a mud intake inlet and a mud discharge outlet and having a drive shaft, a water pump having a drive shaft and having a water intake inlet and a water discharge outlet, valve means communicating the discharge of said water pump with the intake of said mud pump, a mud inlet line communicating with the intake of said mud pump, a mechanical screen comprising a cylindrical screen housing having a peripheral mud intake inlet near one end thereof and a peripheral discharge outlet downstream from the mud inlet and having a transverse screen disposed between the mud inlet and mud outlet of said housing, means for removing accumulated mud from said screen comprising a rotary scraper having a drive shaft coupled to the drive shaft of said mud pump for coaction therewith, a pipe communicating the discharge of said mud pump with said mud intake of said mechanical screen housing, a bypass line communicating the discharge of said water pump with the discharge of said mechanical screen, means transmitting power from said prime mover to said shaft of said water pump, and overload dishuptable means transmitting power from said prime mover to said shaft of said mud pump whereby on ruptable means transmitting power from said prime of said mud pump water will continue to be supplied by said water pump to the discharge outlet of said screen housing for flushing purposes.

2. In a mud dilution apparatus, the combination of a prime mover, a mud pump having a mud inlet and a mud outlet and a drive shaft, a water pump having a drive shaft, a water inlet and a water outlet, means communicating the outlet of said water pump with the inlet of said mud pump, a mud supply line connected to the inlet of said mud pump, a mechanical screen comprising a housing having a mud inlet in communication with the outlet of said mud pump, said housing also having a mud outlet, a screen element provided in said housing between said mud inlet and mud outlet thereof, said screen element being adapted for extraction of granular particles from mud passing therethrough, a rotary scraper provided in said housing for cleaning said screen element, means operatively connecting said rotary scraper to said drive shaft of said mud pump, a by-pass line communicating the outlet of said water pump with the mud outlet of said mechanical screen housing, means operatively connecting the drive shaft of said water pump to said prime mover, and overload disruptable means operatively connecting the drive shaft of said mud pump to said prime mover, whereby water may continue to be supplied to the mud outlet of said housing by said water pump when said operative connecting means between said prime mover and said mud pump drive shaft are disrupted by overload of said rotary scraper.

3. The combination as defined in claim 2 wherein said mechanical screen housing is provided at the mud inlet side of said screen element with a trap for granular particles extracted from mud passing through the screen element, and means for discharging extracted granular particles from said trap.

4. The combination as defined in claim 2 wherein said overload disruptable means comprise a pair of pulleys provided on the drive shaft of said mud pump and on said prime mover, and a drive belt passing around said pair of pulleys, said drive belt being frangible and disruptable in the presence of overload of said rotary scraper.

5. The combination as defined in claim 2 wherein said means connecting said rotary scraper to said drive shaft of said mud pump includes a drive shaft for said rotary scraper, said scraper drive shaft and said mud pump drive shaft being connected together in axial alignment, said overload disruptable means comprising a pair of pulleys provided on the mud pump drive shaft and on said prime mover, and a drive belt passing around said pair of pulleys, said drive belt being frangible and disruptable in the presence of overload of said scraper.

6. In a mud dilution apparatus, the combination of a mud pump having a mud inlet and a mud outlet, a water pump having a water inlet and a water outlet, a mechanical screen comprising a housing having an inlet and an outlet, the inlet of said housing being connected to the outlet of said mud pump, a screen element provided in said housing between the inlet and outlet thereof and adapted for extraction of granular particles from mud passing therethrough, the outlet of said water pump being connected to the mud inlet of said mud pump, a by-pass line communicating the outlet of the water pump with the outlet of said mechanical screen housing, a rotary scraper provided in said housing for cleaning said screen element, a prime mover, frangible drive means operatively connecting said prime mover to said mud pump and to said rotary scraper for simultaneous operation thereof, and second drive means operatively connecting said water pump to said prime mover for operation of the water pump independently of the first mentioned drive means, whereby water may continue to be supplied to the outlet of said housing by said water pump when the first mentioned drive means to the mud pump and rotary scraper are frangibly disrupted by overload of the rotary scraper.

7. In a mud dilution apparatus, the combination of a prime mover, a mud pump having a mud inlet and a mud outlet and a drive shaft, a water pump having a drive shaft, a water inlet and a water outlet, means communicating the outlet of said water pump with the inlet of said mud pump, a mechanical screen comprising a housing having a mud inlet in communication with the outlet of said mud pump, said housing also having a mud outlet, a mud classifier connected to the mud outlet of said housing, a screen element provided in said housing between said mud inlet and mud outlet thereof, said screen element being adapted for extraction of granular particles from mud passing to said classifier, a rotary scraper provided in said housing for cleaning said screen element, means operatively connecting said rotary scraper to said drive shaft of the mud pump, a by-pass line communicating the outlet of said water pump with the mud outlet of said mechanical screen housing, means operatively connecting the drive shaft of said water pump to said prime mover, and overload disruptable means operatively connecting the drive shaft of said mud pump to said prime mover, whereby water may continue to be supplied to said classifier through said by-pass line when said operative connecting means between said prime mover and said mud pump drive shaft are disrupted by overload of said rotary scraper.

References Cited by the Examiner
UNITED STATES PATENTS

| 541,324 | 6/95 | Giles | 209—358 X |
| 733,161 | 7/03 | Comegys | 209—358 |
| 1,586,395 | 5/26 | Behr | 210—416 X |
| 2,218,533 | 10/40 | Huebotter | 175—66 |
| 3,085,587 | 4/63 | O'Shields | 137—4 |

FOREIGN PATENTS

| 651,094 | 3/51 | Great Britain. |
| 248,084 | 1/48 | Switzerland. |

REUBEN FRIEDMAN, *Primary Examiner.*

HERBERT L. MARTIN, *Examiner.*